United States Patent [19]
Mitchell

[11] 3,730,470
[45] May 1, 1973

[54] DEMOUNTABLE OPTICAL TOOLING SCALE FIXTURE

[75] Inventor: John S. Mitchell, Walnut Creek, Calif.

[73] Assignee: The Dow Chemical Company, Midland, Mich.

[22] Filed: Oct. 22, 1971

[21] Appl. No.: 182,769

[52] U.S. Cl..................................248/274, 33/293
[51] Int. Cl. ................................................G01c 15/12
[58] Field of Search.....................248/278, 279, 276, 248/274; 33/293, 296

[56] References Cited

UNITED STATES PATENTS

| | | | |
|---|---|---|---|
| 2,467,733 | 4/1949 | Ehrenberg | 33/293 |
| 2,652,221 | 9/1953 | Kampa | 248/278 |
| 2,913,827 | 11/1959 | Dobson | 33/293 |
| 3,203,656 | 8/1965 | Bartz | 248/279 X |
| 3,599,336 | 8/1971 | Walsh | 33/293 X |

Primary Examiner—J. Franklin Foss
Attorney—Edward E. Schilling et al.

[57] ABSTRACT

A demountable optical tooling scale fixture wherein a tooling ball is demountably attached by a connecting member and plate to a reference point on a surface to be measured and is positioned within and rotatably gripped by two plates set in a face-to-face relationship to each other; said plates are designed to receive optical tooling scales directly or by means of adaptors. In each case, the optical tooling scale will be positioned in a known spatial and angular relationship to the ball which in turn is held at a known distance from the point of mounting on the surface to be measured.

12 Claims, 7 Drawing Figures

PATENTED MAY 1 1973

INVENTOR.
John S. Mitchell
BY
Edward E. Schilling
ATTORNEY

INVENTOR.
John S. Mitchell
BY
Edward E. Schilling
ATTORNEY

DEMOUNTABLE OPTICAL TOOLING SCALE FIXTURE

BACKGROUND OF THE INVENTION

This invention relates to demountable optical tooling scale fixtures for holding optical tooling scales accurately and rigidly for an indefinite period of time in a desired spatial and angular relationship with a surface to be measured while being viewed through a measuring instrument such as a transit. Such surfaces include the surface of a turbine housing or other heavy equipment subject to expansion or contraction and in which close dimensional tolerance must be met and maintained.

Previously such scales were hand held during measurement, leading to inaccuracy and non-reproducibility. Such operations required at least two persons, one to hold the optical tooling scale and one to take the measurement.

It is therefore an object of the present invention to provide a demountable optical tooling scale fixture for holding optical tooling scales accurately and rigidly for an indefinite period of time in a desired spatial and angular relationship with a surface to be measured.

It is a further object to provide such a fixture that is quickly and easily demountable and that provides for making reproducible measurements.

It is a still further object of the instant invention to provide a demountable optical tooling scale fixture such that optical measurements can be readily accomplished by one person.

SUMMARY OF THE INVENTION

In accordance with the present invention, a demountable optical tooling scale fixture comprises:

a. a base plate and a cover plate positioned in face-to-face relationship;

b. said base plate and said cover plate each having formed on their opposed surfaces a partial ball seat of approximately equal dimensions, the seats being aligned and mutually opposed so as to cooperatively receive a spherical tooling ball;

c. connecting means for fastening the plates together;

d. a spherical tooling ball positioned in said opposing ball seats and rotatably gripped by the seating surfaces of both ball seats upon engaging said connecting means;

e. said base plate having a thickness less than the radius of curvature of the ball seat formed therein, thereby forming an opening through the base plate centrally of said ball seat and communicating therewith;

f. mounting means attachable to a surface to be measured, said mounting means including a shank portion extending through said opening in said base plate, and said tooling ball being attached to the distal end of said shank portion, the maximum transverse dimension of the shank adjacent the tooling ball being substantially less than the diameter thereof, and the longitudinal axis of the shank being substantially aligned with a radius of said tooling ball, thereby allowing said plates rotatably gripping said tooling ball to be adjustably rotated through an angle of rotation about said tooling ball surface to place the plates in a predetermined relationship with the surface to be measured, said rotation being limited by the relationship between the size of said opening and the transverse dimension of said shank; and g. means for mounting at least one optical tooling scale on at least one of the plates in a plane parallel to a radius of the tooling ball.

In another embodiment of the present invention, the described demountable optical tooling scale fixture is modified by adding thereto an adaptor comprising a portion serving as adaptor securing means and a web portion attached thereto, the web portion having at least one broad shallow groove designed to receive and secure an optical tooling scale, said web portion being attached by the adaptor securing means to the plates at a predetermined angle relative to the plane thereof.

As employed in the present specification and claims, the term "optical tooling scale" designates a graduated scale suitable for precision measurement operation using optical instruments, e.g., a transit-like apparatus.

The term "parallel to a radius of the tooling ball" as used in the present specification and claims, encompasses both of the relationships of being coincident with or parallel to and spaced apart from a radius of the tooling ball.

The term "channel" as used in the present specification and claims refers to indexing means fashioned in either the base plate or cover plate or both along the juncture of the opposing surfaces of these plates.

The term "groove" as employed in the present specification and claims designates indexing means for optical tooling scales fashioned in the web portions of adaptors.

The term "slot" as used in the present specification and claims refers to indexing means fashioned in the cover plate for receiving the web portions of adaptors.

The term "adaptor securing means" as employed in the present specification and claims designates a means whereby an adaptor is secured to the plates; for example, at least one flange designed to be received in a channel or groove.

THE DRAWINGS

PREFERRED EMBODIMENT

Figure 1:
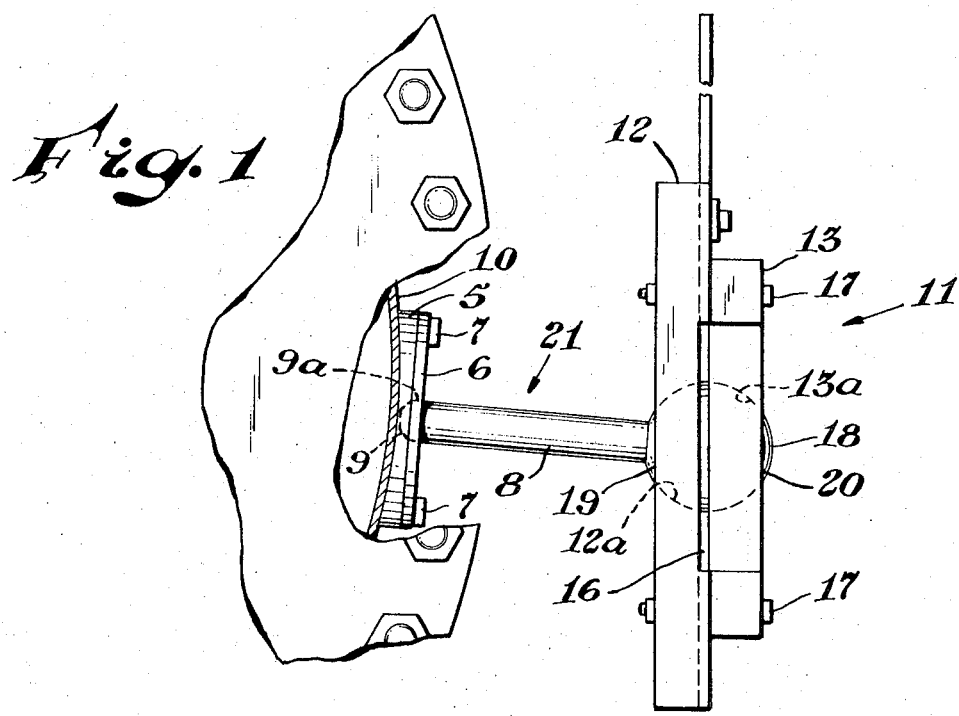
FIG. 1 is a view in side elevation of the demountable optical tooling scale fixture attached to a surface to be measured with an optical tooling scale positioned in a channel in the plane of the plates.
Figure 2:
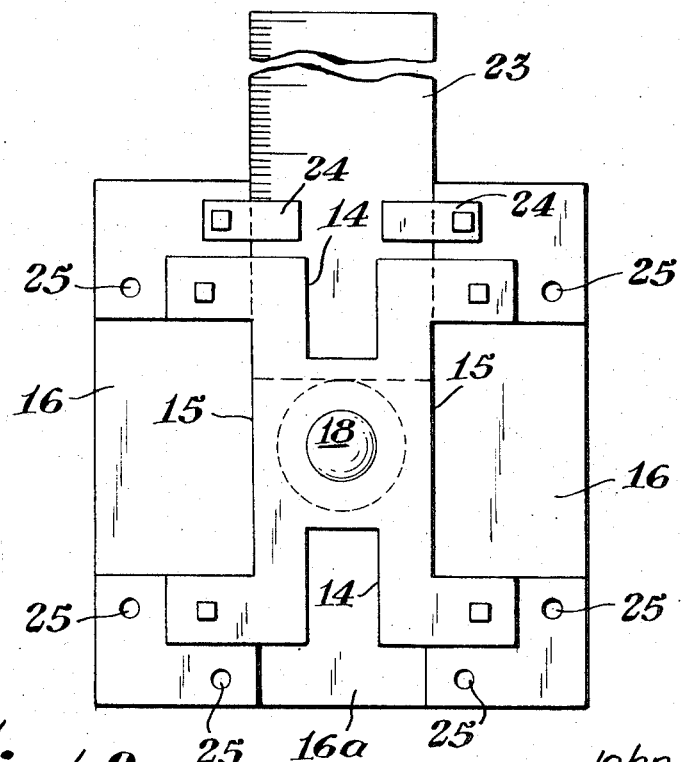
FIG. 2 is a front elevation of the fixture and scale shown in FIG. 1.

Referring to FIGS. 1 and 2, it is seen that the demountable optical tooling scale fixture of the present invention is attached to a surface to be measured, generally referred to by the numeral 10, e.g., a turbine housing. Such attachment is accomplished by employing a mounting means generally referred to by the numeral 21 comprising a precision base 5 that is generally permanently attached to the surface to be measured by welding or gluing with a metal adhesive or by other suitable means. A bracket 6 is connected to the base 5 by means of the screws 7 or any other attachment means assuring a rigid, accurate fit onto the surface to be measured 10.

Extending outwardly from the bracket 6 is a shank 8 that passes through opening 19 in base plate 12 and is permanently attached at its distal end to a tooling ball 18; this shank is preferably threadably connected to the bracket 6 or held by other suitable means. The maximum transverse dimension of the shank 8 adjacent to the tooling ball 18 is substantially less than the diameter of the tooling ball 18, and the longitudinal axis of the shank 8 is substantially aligned with a radius of the tooling ball 18, thereby allowing the plates 12 and 13 rotatably gripping the tooling ball 18 to be adjustably rotated through an angle of rotation about the tooling ball surface to place the plates 12 and 13 in a predetermined relationship with the surface to be measured 10, said rotation being limited by the relationship between the size of opening 19 and the transverse dimension of shank 8. By way of example, a suitable ratio of shank thickness to ball diameter is in the range of about 1:2 to 1:3. The attached end portion 9 of shank 8 extends outwardly along the longitudinal axis of the shank 8 and terminates in a champfered end that fits into the base at hole 9a, the hole 9a providing a reference point on the surface to be measured. While this method of attaching the demountable optical tooling scale fixture (generally referred to by numeral 11) to the surface to be measured 10 is a preferred embodiment, any means for attaching the fixture 11 rigidly and accurately will suffice. For example, the tooling ball 18 could be threadably attached to the shank 8 while leaving the base 5, the bracket 6 and the shank 8 permanently attached to the surface to be measured 10.

The demountable optical tooling scale fixture 11 is a combination of parts including a base plate 12 and a cover plate 13 positioned in face-to-face relationship. Any convenient size of plates could be used, but in this preferred embodiment the cover plate 13 is smaller than the base plate 12. Both plates 12 and 13 are substantially rectangular in shape, but the present invention is not so limited. Any convenient shape of plate could be employed as long as the basic purposes of the invention are fulfilled. The cover plate 13 has formed therein two pairs of opposed slots 14 and 15, each slot extending from the face opposed to the base plate to the opposite face and inwardly from an edge of the cover plate 13 towards the central portion. The slots 14 and 15 are provided in order to facilitate the use of adaptors 26 and 30 in FIGS. 3 and 4, later to be discussed; however, it is not necessary to this invention that slots be made in the cover plate 13, or, if made, nor is the location critical except that the slots 14 and 15 are each respectively aligned with a channel, e.g., channels 16 and 16a. In the present embodiment, pair 15 is larger than pair 14. Again, the shape of the slots 14 and 15 or their position is not determinative of the scope of the present invention so long as each is aligned with a channel and adapted to receive the web portion of an adaptor, though other means of attaching adaptors, such as simple brackets (not shown) may be used, if desired.

The base plate 12 and the cover plate 13 each have formed on their opposed surfaces a partial ball seat, respectively denoted 12a and 13a; said partial ball seats 12a and 13a are approximately centrally located on their respective plates 12 and 13 and are of approximately equal dimensions, and are aligned and mutually opposed. Preferably, the seats are just shallow enough to permit adjustably bringing some pressure on the enclosed ball when the plates are drawn together by fasteners so as to regulate the frictional rotational engagement between ball and seat. While the ball seats 12a and 13a must be aligned, mutually opposed and of approximately equal dimensions, they could be placed at any convenient point on the opposed surfaces of plates 12 and 13.

A connecting means 17 fastens the plates together in the face-to-face relationship when engaged. In this preferred embodiment stove bolts are employed, but any suitable means such as metal screws could be used.

Located within the ball seats 12a and 13a of the assembled fixture is a spherical tooling ball 18 that is rotatably gripped by the seating surfaces of both ball seats 12a and 13a upon engaging the connecting means 17 with the requisite tension.

In this embodiment both the base plate 12 and the cover plate 13 have substantially the same thickness which is less than the radius of curvature of the ball seats 12a and 13a formed therein; this provides an opening 19 through the base plate 12 and an opening 20 through the cover plate 13 which are of substantially equal dimensions, aligned and communicating with the respective ball seats 12a and 13a. While the opening 19 through the base plate 12 is necessary in this invention, the opening 20 is not; hence the cover plate 13 could be of any reasonable thickness, either providing or omitting an opening such as the opening 20.

Two opposed pairs of channels 16 and 16a are formed in the base plate 12 along the juncture of the opposing surfaces of the plates 12 and 13 and set at approximately right angles to each other, each pair of channels 16 and 16a communicating with the tooling ball 18 and extending outwardly along a straight line to an edge of the base plate, thereby providing two pairs of opposed channels. These channels provide means for mounting optical tooling scales in a plane coincident with a radius of the tooling ball; however any means which would mount the optical tooling scales in a plane coincident with or parallel to a radius of the tooling ball would suffice.

The number, size, configuration and relationship of the channels is not critical as long as a particular configuration fulfills the basic purposes of this invention of providing means for holding an optical tooling scale at an accurately known distance and attitude relative to the surface to be measured. For example, in the present preferred embodiment, channels 16 are larger than channels 16a to accommodate larger and longer tooling scales sometimes used. The channels preferably communicate with the tooling ball 18 but may stop at a predetermined, accurately known, point on the plates. Further, the channel may be formed in either the base plate 12 or the cover plate 13, or both, as desired.

An optical tooling scale 23 is shown positioned and secured in a channel 16a and preferably is further secured by fastening means 24. The drilled and tapped openings 25 are means for positioning and employing the fastening means 24 onto the base plate 12. In place of the fastening means 24 the fastener used can be of any type that further secures a particular optical tooling scale into position.

Figure 4:
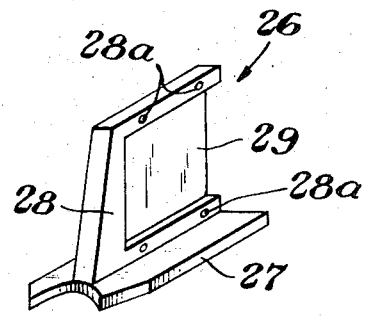
FIG. 4 is a perspective view of another form of adaptor to be positioned in a channel in the plates.
Figure 5:
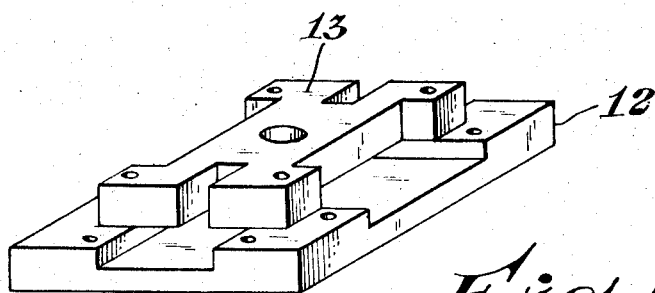
FIG. 5 is a perspective view of the base and cover plate positioned in a face-to-face relationship with connecting means engaged.
Figure 6:
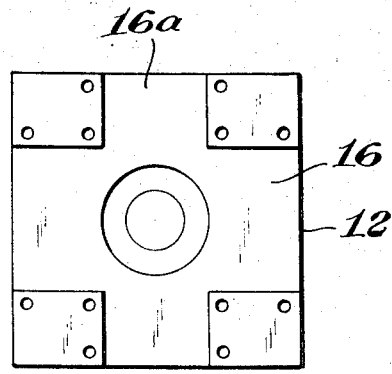
FIG. 6 is a plan view of the base plate.
Figure 7:
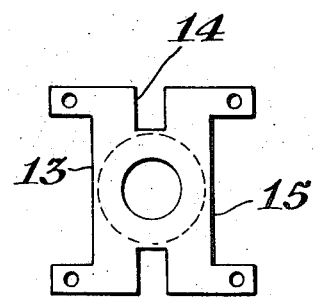
FIG. 7 is a plan view of the cover plate.

A useful modification of the demountable optical tooling scale fixture of FIGS. 1 and 2 can be obtained by employing the adaptor 26 shown perspectively in FIG. 4. Such an adaptor has a flange portion 27 serving as an adaptor securing means and a web portion 28 attached thereto having a groove 29 designed to receive and secure an optical tooling scale 23 (or a like one) by fastening means (not shown, but drilled and tapped openings 28a are means for positioning fastening means, for example, fastening means 24) for further securing the optical tooling scale into groove 29. The flange portion 27 is receivable by a channel 16a, and the web portion 28 attached thereto is simultaneously receivable by the smaller slot 14 in cover plate 13 and extends normally to the cover plate 13 when assembled therewith. The groove 29 extends in a straight line from the edge of the web portion 28 to a predetermined point on the web portion 28 and along a line substantially parallel to the plane of the cover plate, the edge of the web portion 28 extending away from the cover plate 13.

Any adaptor securing means that operates to fixedly hold an adaptor in a desired angular and spatial relationship with the plates 12 and 13 is operable with the fixture of the invention. In the embodiment shown in the drawings a flange is used that fits into the channels 16 that can alternatively be used to receive an optical tooling scale 23. Further, the web portion 28 is only one possible configuration of the adaptor and the shape of groove 29 need not be limited to the configuration shown. Any style adaptor that holds optical tooling scales in desired angular and spatial positions out of the plane of the plates is usable. Such an adaptor preferably includes more than one indexing means or channel for holding optical tooling scales and may be attached to the plates by bolts.

Figure 3:
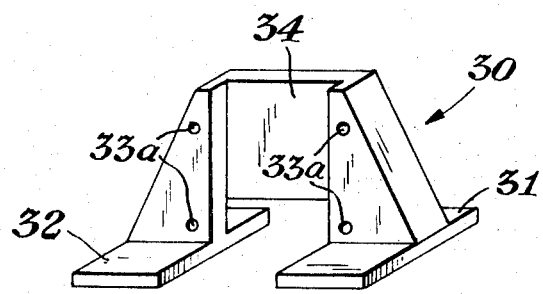
FIG. 3 is a perspective view of an adaptor suitable for positioning in a pair of opposed channels in the plates.

Another useful modification of the demountable optical tooling scale fixture of FIG. 1 and FIG. 2 is obtained by employing the adaptor 30 shown in perspective in FIG. 3. Such an adaptor has two flange portions 31 and 32 and a bifurcated web portion 33 formed therewith. The web portion 33 has a groove 34 designed to receive and secure an optical tooling scale 23 (or an equivalent graduated scale) and fastening means (not shown, but drilled and tapped openings 33a are means for attaching a fastening means, for example, fastening means 24) for further securing the optical tooling scale into groove 34. The flange portions 31 and 32 are simultaneously receivable by a pair of opposed channels 16 and the web portion 33 is simultaneously receivable by a pair of larger slots 15 in the cover plate 13; the web portion 33 extends normally to the cover plate 13. The groove 34 extends inwardly in a straight line from an edge of the web portion 33 to communication with the tooling ball 18, allowing a tooling scale therein to touch the ball, and extends along a line substantially normal to the plane of the cover plate 13, the edge of the web portion 33 extending away from the cover plate 13.

The remarks concerning adaptor 26 are also applicable to adaptor 30, i.e., the present invention is not limited to these particular adaptor configurations.

The various parts of the device of the invention may be fabricated from most any material of construction that is durable and readily shaped and dimensionally stable, for example, mild steel or aluminum or magnesium alloy.

I claim:

1. A demountable optical tooling scale fixture, comprising:
   a. a base plate and a cover plate positioned in face-to-face relationship;
   b. said base plate and said cover plate each having formed on their opposed surfaces a partial ball seat of approximately equal dimensions, the seats being aligned and mutually opposed so as to cooperatively receive a spherical tooling ball;
   c. connecting means for fastening the plates together;
   d. a spherical tooling ball positioned in said opposing ball seats and rotatably gripped by the seating surfaces of both ball seats upon engaging said connecting means;
   e. said base plate having a thickness less than the radius of curvature of the ball seat formed therein, thereby forming an opening through the base plate centrally of said ball seat and communicating therewith;
   f. mounting means attachable to a surface to be measured, said mounting means including a shank portion extending through said opening in said base plate, and said tooling ball being attached to the distal end of said shank portion, the maximum transverse dimension of the shank adjacent the tooling ball being substantially less than the diameter thereof, and the longitudinal axis of the shank being substantially aligned with a radius of said tooling ball, thereby allowing said plates rotatably gripping said tooling ball to be adjustably rotated through an angle of rotation about said tooling ball surface to place the plates in a predetermined relationship with the surface to be measured, said rotation being limited by the relationship between the size of said opening and the transverse dimension of said shank; and
   g. means for mounting at least one optical tooling scale on at least one of the plates in a plane parallel to a radius of the tooling ball.

2. The demountable optical tooling scale fixture as in claim 1 wherein the means for mounting the at least one optical tooling scale on at least one of the plates is a channel formed along the juncture of said opposing surfaces in at least one of said opposing surfaces.

3. The demountable optical tooling scale fixture of claim 2 wherein each channel communicates with said tooling ball and extends along a straight line to an edge of the plate in which the channel is formed.

4. The demountable optical tooling scale fixture of claim 1 wherein:
   a. said base plate and said cover plate are each substantially rectangular in shape, the cover plate being smaller than the base plate and having formed therein two pairs of opposed slots, each slot being set at approximately right angles to each other and extending inwardly from an edge towards the central portion of said cover plate and being aligned with a channel, one pair being substantially larger than the other pair;

b. said ball seats formed on the opposing surfaces of said base plate and said cover plate are approximately centrally located in their respective plates;

c. said cover plate has substantially the same thickness as said base plate, thereby providing an opening of substantially equal dimension as the opening in said base plate and aligned therewith;

d. said mounting means is readily detachable from the surface to be measured; and e. the means for mounting the at least one optical tooling scale on at least one of the plates in a plane parallel to a radius of the tooling ball is four channels formed in the base plate along the juncture of said opposing surfaces and set at approximately right angles to each other, each channel communicating with said tooling ball and extending outwardly along a straight line to an edge of the base plate, thereby providing two pairs of opposed channels.

5. The demountable optical tooling scale fixture of claim 1 in combination with an adaptor comprising a portion serving as adaptor securing means and a web portion attached thereto, the web portion having at least one groove designed to receive and secure an optical tooling scale, said web portion being attached by the adaptor securing means to the plate at a predetermined angle relative to the plane thereof.

6. The demountable optical tooling scale fixture of claim 5 which includes fastening means further securing optical tooling scales and adaptor securing means designed to be received respectively within said channels.

7. An adaptor as in claim 5 wherein said adaptor securing means is a single flange portion designed to be received in at least one channel formed along the juncture of said opposing surfaces in at least one of said opposing surfaces.

8. An adaptor as in claim 5 wherein said adaptor securing means is two flange portions designed to be received respectively into two respective channels, each channel being formed along the juncture of said opposing surfaces in at least one of said opposing surfaces.

9. An adaptor as in claim 5 which includes fastening means for further securing at least one optical tooling scale in said at least one groove.

10. The combination of claim 5 wherein said web portion is positioned in a plane that is normal to the plane of the plates.

11. A demountable optical tooling scale fixture as described in claim 4 in combination with an adaptor comprising a flange portion and a web portion attached thereto, said web portion having a groove designed to receive and secure an optical tooling scale and a fastening means for further securing the optical tooling scale in said groove, said flange portion being receivable by a channel and said web portion being simultaneously receivable by a smaller said slot in said cover plate and extending normally to said cover plate, said groove extending in a straight line from an edge of said web portion to a predetermined point on said web portion and along a line substantially parallel to the plane of said cover plate, said edge of said web portion extending away from said cover plate.

12. A demountable optical tooling scale fixture as described in claim 4 in combination with an adaptor comprising two flange portions and a web portion attached thereto, said web portion being bifurcated and having a groove designed to receive and secure an optical tooling scale and a fastening means for further securing the optical tooling scale in said groove, said flange portions being simultaneously receivable by a pair of opposed channels and said bifurcated web portion being simultaneously receivable by a pair of larger said slots in said cover plate and extending normally to said cover plate, said groove extending inwardly in a straight line from an edge of said web portion to communication with said tooling ball and along a line substantially normal to the plane of said cover plate, said edge of said web portion extending away from said cover plate.

* * * * *